S. G. NOTTAGE.
ROTOR WINDING FOR ASYNCHRONOUS MACHINES.
APPLICATION FILED JULY 14, 1915.

1,238,321.

Patented Aug. 28, 1917.

WITNESSES:
Fred H Miller
P. D. Brown

INVENTOR
Stanley G. Nottage
BY
Wesley G. Carr
ATTORNEY

UNITED STATES PATENT OFFICE.

STANLEY G. NOTTAGE, OF WILKINSBURG, PENNSYLVANIA, ASSIGNOR TO WESTINGHOUSE ELECTRIC AND MANUFACTURING COMPANY, A CORPORATION OF PENNSYLVANIA.

ROTOR-WINDING FOR ASYNCHRONOUS MACHINES.

1,238,321.   Specification of Letters Patent.   Patented Aug. 28, 1917.

Application filed July 14, 1915. Serial No. 39,800.

*To all whom it may concern:*

Be it known that I, STANLEY G. NOTTAGE, a subject of the King of England, and a resident of Wilkinsburg, in the county of Allegheny and State of Pennsylvania, have invented a new and useful Improvement in Rotor-Windings for Asynchronous Machines, of which the following is a specification.

My invention relates to rotor windings for asynchronous dynamo-electric machines, and it has special reference to rotor windings for phase converters such as are employed for converting single-phase alternating-current energy into polyphase energy for the purpose of supplying polyphase electric motors.

The object of my invention is to provide a rotor winding for machines of the above indicated character which shall be simple and rugged in construction and adapted to minimize the eddy-current losses incident to the operation of this class of machines.

Figure 1:
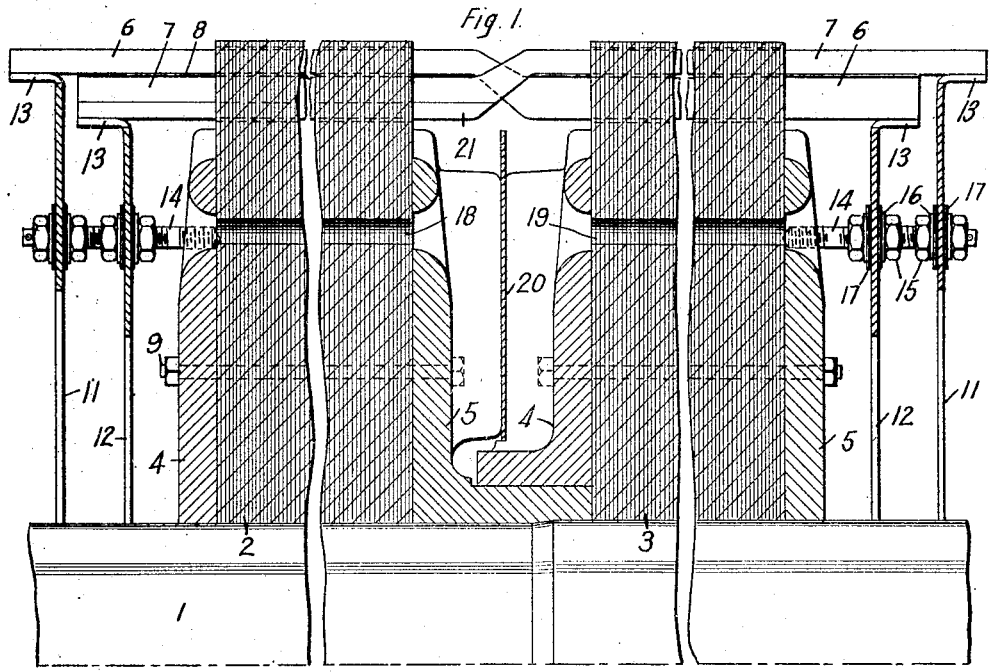
Figure 2:
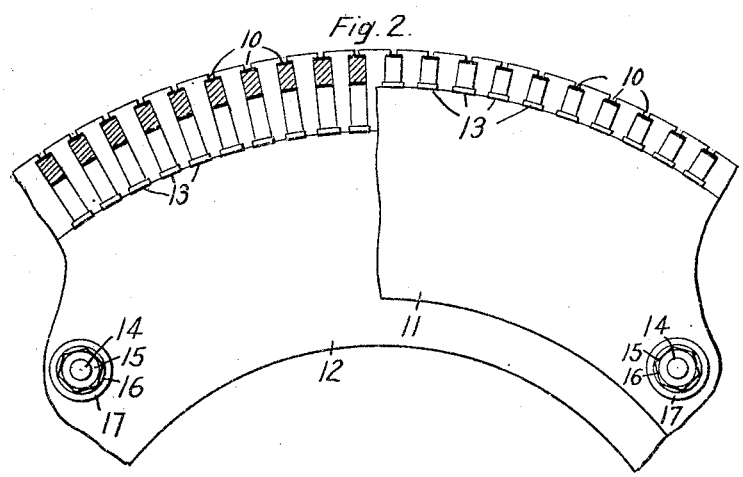

In the accompanying drawing, Figure 1 is a side view, partially in elevation and partially in section, of a portion of a phase converter constructed in accordance with my invention, and Fig. 2 is an end view, partially in elevation and partially in section, of the structure shown in Fig. 1.

In large-capacity phase converters of the induction type that are provided with squirrel-cage rotor windings, the current-carrying conductors of the squirrel-cage windings are necessarily of large cross-sectional area in which excessive heating is produced. In the copending application for patent of Rudolf E. Hellmund, Serial No. 20,694, filed April 12, 1915, it is pointed out that the frequency of the current in the secondary winding of a phase converter is double that of the source of energy to which the converter is connected and that the excessive heating effect in the rotor is caused by the abnormal eddy currents produced in the large rotor conductors by reason of the relatively high frequency of the secondary currents. In the above mentioned copending application, it is proposed to lessen such eddy currents by employing a plurality of separate and independent squirrel-cage windings and thereby subdividing the otherwise large mass of rotor conductors into several windings of relatively small section. This expedient serves to lessen, to a considerable degree, the extra-eddy losses caused by the rotor currents of double frequency. This arrangement, however, has the disadvantage that the two or more concentric windings do not carry their correct share of the current by reason of the different densities of the magnetic fields traversed by several sets of windings.

According to my present invention, I overcome the disadvantage just mentioned by a special arrangement of the conductors composing the independent rotor windings of a phase converter, whereby all of the conductors in each of the peripheral slots of the rotor are caused to carry the same amounts of current. When two independent squirrel-cage windings are employed, I prefer to accomplish this result by inverting the two conductors in each slot at a point substantially midway between the ends of the conductors. Therefore, since one-half of the length of each bar is disposed at the top of the slot and the other half at the bottom of the slot, they will both carry the same currents when the machine is operated.

Another feature of my invention consists in connecting the upper bar, that is to say, the bar next to the slot opening, of smaller cross-sectional area than the lower bar, the relative proportions of the two bars being preferably so designed as to give minimum eddy currents and, consequently, minimum heating effects. This feature of my invention may well be combined with the feature of inverting the conductor bars in each rotor slot, thus greatly improving the operating characteristics of the machine with respect to eddy currents and consequent heating losses.

For a better understanding of my invention, reference may now be had to the accompanying drawing, which shows a phase converter rotor embodying a shaft 1, two parallel magnetizable core members 2 and 3 confined between pairs of end plates 4 and 5, and a plurality of squirrel-cage windings 6 and 7.

The magnetizable core members 2 and 3 are preferably composed of a plurality of laminations assembled in side-by-side relation and compactly secured together between the end plates 4 and 5 by means of rivets or bolts 9. The magnetizable core members are provided with registering peripheral slots 10 in which both of the squirrel-cage windings 6 and 7 are disposed, the one above the other, in concentric rows and separated from each other by layers of insulation 8.

It will be noted that the conductor bars composing the respective squirrel-cage windings 6 and 7 are longitudinally displaced with respect to each other so that the conductors of one winding project beyond those of the other at each end of the rotor. The concentric rows of conductors have their respective ends electrically connected to short-circuiting end rings 11 and 12, such end rings preferably comprising annular members of sheet metal provided with equally-spaced bent-over integral lips or ears 13 that are welded or otherwise intimately secured to the end portions of the conductor bars 6 and 7. By reason of the relative thinness and flexibility of the sheet-metal ears 13, their construction is well adapted for brazing and welding operations.

The end rings 11 and 12 of the respective windings 6 and 7 may be conveniently supported and rigidly positioned by means of a plurality of bolts 14 which project through openings in the adjacently located end rings 11 and 12 and are rigidly associated therewith by means of nuts 15, washers 16 and insulating bushings 17.

The laminated core members 2 and 3 may be provided with transverse ventilating openings 18 and 19 through which air may be drawn by means of a suitable annular fan blade 20 in the manner usual in machines of this character.

Referring particularly to Fig. 1, it will be observed that the lower conductor bar is considerably thicker than the upper conductor bar, the exact ratio between the cross sectional areas of the two bars being determined in accordance with the size and electrical characteristics of the machine. It will also be noted that the conductor bar 6 is disposed above the conductor bar 7 at the left of Fig. 1, while the positions of these bars are inverted at the right of Fig. 1, the bars being suitably bent at substantially their middle points in order to provide the necessary cross-over connections between the two horizontal parts of the bars.

The two horizontal portions of each conductor bar are of different cross-sectional areas and this non-uniform shape may either be integrally formed or, preferably, made by welding a strip of metal to the portion of each bar which is to occupy the bottom of the slot, thereby thickening such portion of the bar to the necessary extent. This construction is illustrated at the left of Fig. 1, a strip 21 being united to the under side of the bar 7.

The rotor shown in the drawing is assembled by pressing one of the core members 2 and 3 upon the shaft 1, then inserting the rotor bars, previously twisted over at their centers, and afterward pressing the other core member upon the shaft. The cross-overs between the halves of the conductor bars thus occupy the space between the core members and no difficulty is encountered by reason of the thickness of the twisted pair of bars. When a winding of this type is applied to an armature core which consists of a single laminated member, it is necessary to assemble the pairs of twisted bars and to hammer and trim the cross-over portions until they will pass through the slots.

The structural details which I have shown and described may be variously modified by persons skilled in the art without departing from the principles of my invention, and it is therefore to be understood that my invention is not restricted to such structural details but is limited only by the scope of the appended claims.

I claim as my invention:

1. An asynchronous dynamo-electric machine comprising a rotatable magnetizable member provided with a plurality of independent short-circuited windings, the conductors composing the said windings being so arranged that the said windings carry substantially equal currents.

2. An asynchronous dynamo-electric machine comprising a rotatable magnetizable member provided with a plurality of independent short circuited windings, a part of each conductor composing the said windings being adapted to traverse a relatively strong magnetic field and the remainder of each conductor being adapted to traverse a weaker magnetic field.

3. An asynchronous dynamo-electric machine comprising a rotatable magnetizable member having a plurality of peripheral slots and a plurality of independent sets of conductors disposed in the said slots, each of the conductors in each slot occupying different radial positions therein at different portions of its length.

4. An asynchronous dynamo-electric machine comprising a rotatable magnetizable member having a plurality of peripheral slots and two independent sets of conductors disposed in the said slots, the two conductors in each slot being relatively inverted at a point between their ends.

5. An asynchronous dynamo-electric machine comprising a rotatable magnetizable member composed of two spaced sections respectively provided with slots, and two independent sets of conductors disposed in the said slots, the two conductors in each slot being relatively inverted at a point substantially midway between the said sections.

6. An asynchronous dynamo-electric machine comprising a rotatable magnetizable member having a plurality of peripheral slots and a plurality of independent sets of conductors disposed in the said slots, each of the conductors in each slot occupying different radial positions therein at different portions of its length and having its portion nearest the bottom of the slot of greater cross-sectional area than its portion nearest the top of the slot.

7. An asynchronous dynamo-electric machine comprising a rotatable magnetizable member having a plurality of peripheral slots and two independent sets of conductors disposed in the said slots, the two conductors in each slot being relatively inverted at a point between their ends, the alined portions of the said conductors being of substantially the same cross-sectional areas and the portions nearest the bottom of the slot being of greater cross-sectional area than the outer portions.

8. An asynchronous dynamo-electric machine comprising a rotatable magnetizable member composed of two spaced sections respectively provided with slots, and two independent sets of conductors disposed in the said slots, the two conductors in each slot being relatively inverted at a point substantially midway between said sections, the alined portions of the said conductors being of substantially the same cross-sectional areas and the portions nearest the bottom of the slot being of greater cross-sectional area than the outer portions.

In testimony whereof, I have hereunto subscribed my name this 30th day of June, 1915.

STANLEY G. NOTTAGE.